United States Patent
Shimamura et al.

(10) Patent No.: US 7,609,029 B2
(45) Date of Patent: Oct. 27, 2009

(54) BATTERY, ASSEMBLED BATTERY UNIT, VEHICLE EQUIPPED WITH BATTERY, AND BATTERY VOLTAGE ADJUSTING METHOD

(75) Inventors: Oasamu Shimamura, Yokohama (JP); Kenji Hosaka, Yokosuka (JP); Takuya Kinoshita, Yokosuka (JP); Takaaki Abe, Yokohama (JP); Hedeaki Horie, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 316 days.

(21) Appl. No.: 11/683,626

(22) Filed: Mar. 8, 2007

(65) Prior Publication Data

US 2007/0210760 A1 Sep. 13, 2007

(30) Foreign Application Priority Data

Mar. 9, 2006 (JP) ............................. 2006-064729
Dec. 21, 2006 (JP) ............................. 2006-344894

(51) Int. Cl.
*H01M 10/46* (2006.01)
(52) U.S. Cl. ...................................... 320/116; 320/135
(58) Field of Classification Search ................. 320/107, 320/110, 116, 134, 135, 136, DIG. 21
See application file for complete search history.

(56) References Cited

U.S. PATENT DOCUMENTS

| | | | | |
|---|---|---|---|---|
| 5,680,030 A | * | 10/1997 | Kadouchi et al. | ............ 320/134 |
| 5,703,469 A | * | 12/1997 | Kinoshita | ............ 320/DIG. 21 |
| 5,739,670 A | * | 4/1998 | Brost et al. | ................ 320/131 |
| 2003/0111979 A1 | | 6/2003 | Cheiky et al. | |

FOREIGN PATENT DOCUMENTS

| | | |
|---|---|---|
| EP | 1130672 A2 | 9/2001 |
| EP | 1577973 A1 | 9/2005 |
| JP | 2000-149951 | 5/2000 |
| JP | 2000-195495 | 7/2000 |
| JP | 2001-250591 A | 9/2001 |
| JP | 2005-267886 A | 9/2005 |
| JP | 2005-527172 A | 9/2005 |
| JP | 2006-508518 A | 3/2006 |
| JP | 2006-156357 A | 6/2006 |
| WO | WO-2004/051767 A1 | 6/2004 |
| WO | WO-2006/048732 A1 | 5/2006 |

* cited by examiner

*Primary Examiner*—Edward Tso
(74) *Attorney, Agent, or Firm*—Global IP Counselors, LLP (57) ABSTRACT

A battery is basically provided with an electricity generating element and a discharging section. The electricity generating element has a plurality of electric cells connected in series. The discharging section constantly discharges electricity from each of the electric cells at a prescribed discharge rate so that a voltage in each of the electric cells is lower than a voltage corresponding to a prescribed depth of discharge. The battery is especially useful in a power supply component of a vehicle.

13 Claims, 6 Drawing Sheets

Fig. 10

# BATTERY, ASSEMBLED BATTERY UNIT, VEHICLE EQUIPPED WITH BATTERY, AND BATTERY VOLTAGE ADJUSTING METHOD

CROSS-REFERENCE TO RELATED APPLICATIONS

This application claims priority to Japanese Patent Application No. 2006-064729, filed on Mar. 9, 2006 and Japanese Patent Application No. 2006-344894 filed on Dec. 21, 2006. The entire disclosures of Japanese Patent Application Nos. 2006-064729 and 2006-344894 are hereby incorporated herein by reference.

BACKGROUND OF THE INVENTION

1. Field of the Invention

The present invention relates to a battery, an assembled battery, a vehicle equipped with a battery and a battery voltage adjusting method.

2. Background Information

A conventional vehicle battery is usually formed by connecting a plurality of secondary batteries in series. Recently, a bipolar battery has been used as the secondary battery installed in such a conventional vehicle battery.

For example, Japanese Laid-Open Patent Application Publication No. 2000-195495 discloses a conventional bipolar battery that has a plurality of bipolar electrodes. Each of the bipolar electrodes includes a collector, a positive electrode layer formed on a first surface of the collector and a negative electrode layer formed on a second surface of the collector that is opposite from the first surface. The bipolar electrodes are stacked with an electrolyte layer being interposed therebetween. Accordingly, the conventional bipolar battery includes a plurality of electric cells connected in series with each of the cells having the positive electrode layer and the negative electrode layer that sandwich the electrolyte layer therebetween.

Moreover, Japanese Laid-Open Patent Application Publication No. 2005-149951 discloses a conventional battery having a short circuit control element. More specifically, the conventional battery disclosed in this reference includes the conventional bipolar batteries used as the electric cells, and the bipolar batteries connected in series to form the battery. Each of the electric cells includes the short circuit control element that establishes a short circuit in the corresponding electric cell only when a voltage of the corresponding cell exceeds above a prescribed value. The electric current does not flow in the short circuit control element in a normal state. Therefore, even when an abnormality occurs in any one of the cells, the cell in which the abnormality occurred is shorted by using the short circuit control element to enable current to flow in the cell. Thus, the battery can be continuously used without being adversely affected by the cell in which the abnormality occurred.

In view of the above conventional technology, it will be apparent to those skilled in the art from this disclosure that there exists a need for an improved battery, assembled battery that is especially useful in a vehicle equipped with a battery as well as an improved battery voltage adjusting method. This invention addresses these needs in the art as well as other needs, which will become apparent to those skilled in the art from this disclosure.

SUMMARY OF THE INVENTION

In the conventional bipolar battery disclosed in Japanese Laid-Open Patent Application Publication No. 2000-195495, discussed above, the electric cells are connected in series. Thus, there is a possibility that voltages between the cells will vary while the bipolar battery is in use. If the voltages vary between the cells while the bipolar battery is in use, then the performance of the cell with the lowest voltage will limit the performance of the overall bipolar battery. In addition, such variations in the cell performances will degrade the performance and reduce the life span of the battery as a whole.

On the other hand, in the conventional battery disclosed in Japanese Laid-Open Patent Application Publication No. 2005-149951, the short circuit control element is provided in each of the cells. However, the short circuit control elements in this conventional battery establish a short circuit only when an abnormality occurs. Therefore, the short circuit control elements disclosed in this reference do not solve the problem of voltage variation between the cells that occurs when the battery operates within the range of normal use.

Accordingly, one object of the present invention is to provide a battery or an assembled battery including a plurality of batteries which can improve the performance of the battery as a whole by adjusting the voltage variation between the cells or the batteries. Moreover, another object of the present invention is to provide a vehicle equipped with such a battery or an assembled battery. Furthermore, another object of the present invention is to provide a battery voltage adjusting method that can improve the performance of the battery as a whole by adjusting the voltage variation between a plurality of batteries forming the battery or the assembled battery.

In order to achieve the above objects of the present invention, a battery is provided that basically comprises an electricity generating element and a discharging section. The electricity generating element includes a plurality of electric cells connected in series. The discharging section is configured and arranged to constantly discharge electricity from each of the electric cells at a prescribed discharge rate so that a voltage in each of the electric cells is lower than a voltage corresponding to a prescribed depth of discharge.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
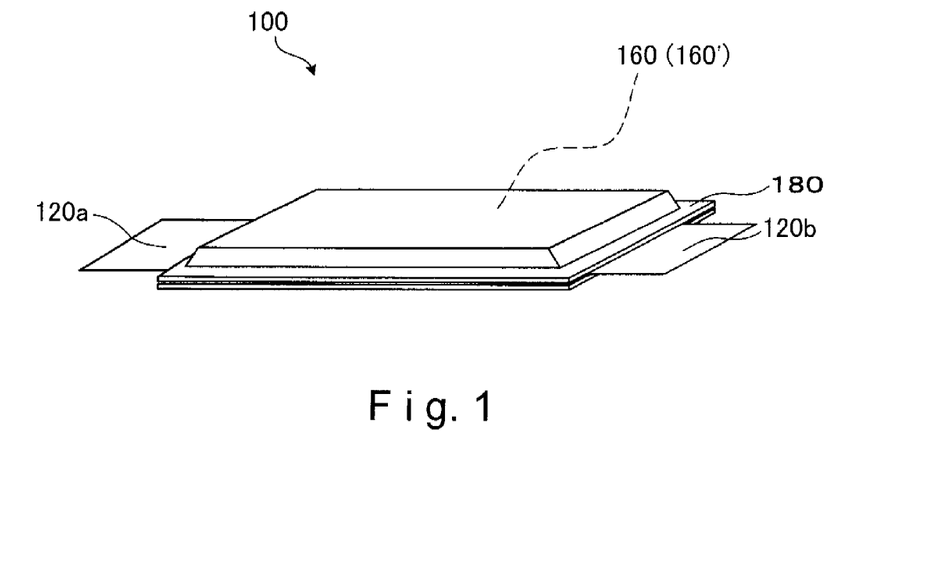
FIG. 1 is an overall perspective view of a bipolar battery in accordance with a first embodiment of the present invention.
Figure 2:
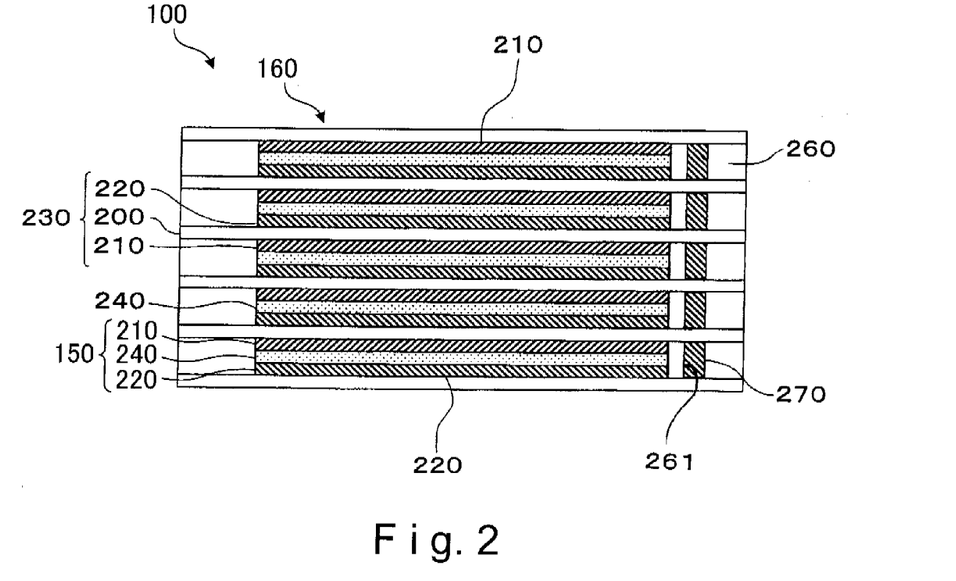
FIG. 2 is a simplified schematic cross sectional view of an electricity generating element of the bipolar battery in accordance with the first embodiment of the present invention.

Referring initially to FIGS. 1 and 2, a bipolar battery 100 is illustrated in accordance with a first embodiment of the present invention. The dimensions (e.g., the thickness and shape) of each layer that constitutes the bipolar battery 100 in FIGS. 1 and 2 are exaggeratedly drawn in order to facilitate understanding of the details of the present invention, and do not conform to the actual dimensions of each layer of the bipolar battery 100.

FIG. 1 is an overall perspective view of the bipolar battery 100 in accordance with the first embodiment of the present invention. As seen in FIG. 1, the bipolar battery 100 has a generally flat and rectangular shape. The bipolar battery 100 internally houses an electricity generating element 160 which is sealed by a sheathing material 180 (e.g., a laminate film). The sheathing material 180 is thermally fused on all four sides of the perimeter of the bipolar battery 100. The bipolar battery 100 further includes a positive electrode tab 120a and a negative electrode tab 120b, which are connected to the electricity generating element 160. As seen in FIG. 1, the positive electrode tab 120a and the negative electrode tab 120b extend out from opposite ends of the sheathing material 180.

FIG. 2 is a simplified schematic cross sectional view of the electricity generating element 160 of the bipolar battery 100 illustrated in FIG. 1 in accordance with the first embodiment of the present invention. As shown in FIG. 2, the electricity generating element 160 is formed as a plurality of bipolar electrodes 230. These bipolar electrodes 230 are stacked with an electrolyte layers 240 interposed between adjacent pair of the bipolar electrodes 230. Each of the bipolar electrodes 230 includes a collector 200, a positive electrode layer 210 formed on a first surface of the collector 200 and a negative electrode layer 220 formed on a second surface of the collector 200, which is opposite from the first surface.

Thus, as seen in FIG. 2, the electricity generating element 160 includes a plurality of electric cells 150 (battery elements). These cells 150 are connected in series with each of the cells 150 being formed by the positive electrode layer 210 and the negative electrode layer 220 that sandwich the electrolyte layer 240. Moreover as seen in FIG. 2, the electricity generating element 160 further includes a plurality of sealing layers 260 and a plurality of short circuit layers 270 (discharging section). Each of the short circuit layers 270 is formed in a through hole 261 of each of the sealing layers 260. Each of the short circuit layers 270 is configured and arranged to electrically interconnect a pair of the collectors 200 that sandwiches corresponding one of the cells 150 so that electricity is discharged at a prescribed discharge rate (discussed in more detail below).

The electricity generating element 160 as shown in FIG. 2 can be formed by using various conventional laminating methods, such as a slurry coating method or a printing method. One example of a method of forming the electricity generating element 160 by slurry coating will now be explained. However, the present invention is not limited to such a slurry coating method.

First, a positive electrode slurry is coated on one surface (first surface) of each of the collectors 200, which is then dried to form the positive electrode layer 210. For example, a slurry formed by mixing a positive electrode active material (e.g., $LiMn_2O_4$), a conducting assistant (e.g., acetylene black), a binder (e.g., PVDF), and a slurry viscosity adjusting solvent (e.g., NMP) can be used as the positive electrode slurry.

Each of the collectors 200 of the first embodiment is preferably made from a material that will not be eluted by discharge heat (e.g., a heat resistant conductive metallic foil such as stainless steel foil (SUS foil)). If copper foil (Cu) is used for the negative electrode collector foil as in the conventional battery, then the copper Cu will undesirably be eluted if the voltage is reduced to a value that is below the normal range of use of the battery (e.g., less than approximately 1.5 V). Thus, when the copper foil is used as the collector 200, the voltage cannot be reduced below the normal range of use (discussed in more detail below with reference to FIG. 4). Accordingly, in the present invention, it is preferable to use, for example, SUS foil, which does not elute even if the voltage is reduced below the normal range of use.

Next, the opposite surface (second surface) of each of the collectors 200 (SUS foil), which is the surface that is opposite from the surface whereon the positive electrode layer 210 is coated, is coated with a negative electrode slurry, which is then dried to form the negative electrode layer 220. For example, a slurry formed by mixing a negative electrode active material (e.g., hard carbon), a binder (e.g., PVDF) and a slurry viscosity adjusting solvent (e.g., such as NMP) can be used as the negative electrode slurry.

Thus, the positive electrode layer 210 and the negative electrode layer 220 are formed on opposite sides of each of the collectors 200 (SUS foil), thereby forming the bipolar electrodes 230. Furthermore, each of the bipolar electrodes 230 is cut off to a prescribed size. Then, the positive electrode layer 210 and the negative electrode layer 220 are trimmed at the peripheral portions of the bipolar electrode 230 to expose the SUS foil (the collector 200) in order to form the sealing layer 260.

Moreover, only a coating of the positive electrode layer 210 is applied on one side of the bipolar electrode 230 disposed in the positive electrode side end pole of the electricity generating element 160, and only a coating of the negative electrode layer 220 is applied on one side of the bipolar electrode 230 disposed in the negative electrode side end pole of the electricity generating element 160.

Next, a separator, such as nonwoven fabric or a microporous membrane that is made of polypropylene and the like, is disposed on the positive electrode layer 210 (or the negative electrode layer 220) so that the separator does not contact the peripheral portions of the bipolar electrode 230 where the SUS foil is exposed. Then, a silicone rubber with a prescribed height, which constitutes the sealing layer 260, is disposed at the peripheral portions of the bipolar electrode 230 where the SUS foil is exposed.

With the first embodiment illustrated in FIG. 2, the short circuit layer 270 (discharging section) with a prescribed dimension is formed in each of the sealing layers 260. As mentioned above, each of the short circuit layers 270 is configured and arranged to electrically interconnect a pair of the collectors 200 that sandwich the cell 150 so that electricity is discharged at a prescribed discharge rate. In the first embodiment, each of the short circuit layers 270 is preferably formed by drilling a through hole 261 that passes vertically (with respect to FIG. 2) through the silicone rubber or the like that constitutes the sealing layer 260, and then filling the through hole 261 in the sealing layer 260 with, for example, carbon, a semiconductor, or a conductive ceramic.

The separator formed on each of the bipolar electrodes 230 is permeated with a pre-gel solution, and the thermal polymerization of the pre-gel solution is performed in an inert atmosphere to form the electrolyte layer 240. Thus, the gel electrolyte layer 240 is supported at a center part of the separator on the bipolar electrode 230. For example, a pre-gel solution formed by mixing a polymer (a copolymer of polyethylene oxide and polypropylene oxide), EC+DMC (1:3), 1.0 mol of $Li(C_2F_5SO_2)_2N$, and a polymerization initiator (BDK) can be used as the pre-gel solution to form the gel electrolyte layer 240.

As discussed above, it is preferable to use a gel solution to form each of the electrolyte layers 240. With this arrangement, liquid leakage can be prevented, and also liquid junctions can be prevented, which are often problems in bipolar secondary batteries. Thus, with the bipolar battery 100 of the first embodiment, a highly reliable stacked battery can be implemented.

The difference between an all solid polymer electrolyte and a polymer gel electrolyte will now be explained. In the polymer gel electrolyte, an electrolytic solution that is normally used in a lithium-ion battery is incorporated in the all solid polymer electrolyte, such as PEO (polyethylene oxide). In addition, the polymer gel electrolyte also falls under the category of an electrolyte wherein an electrolytic solution is supported in the skeleton of a polymer, such as PVDF, PAN, and PMMA, that does not conduct lithium ions. The percentages of the electrolytic solution and the polymer that constitute a polymer gel electrolyte vary widely, e.g., an electrolyte that contains 100% polymer is an all solid polymer electrolyte, one that contains 100% electrolytic solution is a liquid electrolyte, and those in between are all polymer gel electrolytes. On the other hand, all electrolytes that conduct lithium ions, such as polymers or inorganic solids, fall under the category of all solid electrolytes. As used herein, "a solid electrolyte" in the present invention includes all of a polymer gel electrolyte, an all solid polymer electrolyte, and an inorganic solid electrolyte.

In addition, it is preferable to use an oxide of a lithium-transition metal compound in the abovementioned positive electrode active material for forming the positive electrode layer 210, and to use carbon or an oxide of a lithium-transition metal compound in the negative electrode active material for forming the negative electrode layer 220, which makes it possible to implement the bipolar battery 100 that has high capacity and excellent output characteristics.

The side of the negative electrode layer 220 of the bipolar electrode 230 disposed on the lower most portion of the electricity generating element 160 (as viewed in FIG. 2) (the negative electrode side end pole) is connected to the negative electrode tab 120b. The side of the positive electrode layer 210 of the bipolar electrode 230 disposed on the upper most portion of the electricity generating element 160 (as viewed in FIG. 2) (the positive electrode side end pole) is connected to the positive electrode tab 120a. The electricity generating element 160 shown in FIG. 2 includes five electric cells 150 that are connected in series, and thus, a voltage of five times of each of the cells 150 can be achieved between the positive electrode tab 120a and the negative electrode tab 120b. Although, in the first embodiment, the electricity generating element 160 includes the grouping of the five electric cells 150, the number of the cells 150 that are stacked to form the electricity generating element 160 is not limited to this number disclosed in the first embodiment.

The electricity generating element 160 is tightly sealed in a state in which the positive electrode tab 120a and the negative electrode tab 120b that are connected to the electricity generating element 160 extend out. More specifically, the electricity generating element 160 is sealed by wrapping the electricity generating element 160 with the sheathing material 180 (e.g., laminate film) and then by thermal fusing the outer peripheral side portion of the sheathing material 180.

With the electricity generating element 160 in the first embodiment described above, each of the short circuit layers 270 (discharging section) is formed in the corresponding sealing layer 260 such that an electrical connection by the short circuit layer 270 is achieved at the corresponding sealing layer 260. However, the present invention is not limited to such arrangement. For example, FIG. 3 illustrates a modified electricity generating element 160' in accordance with the first embodiment.

Figure 3:
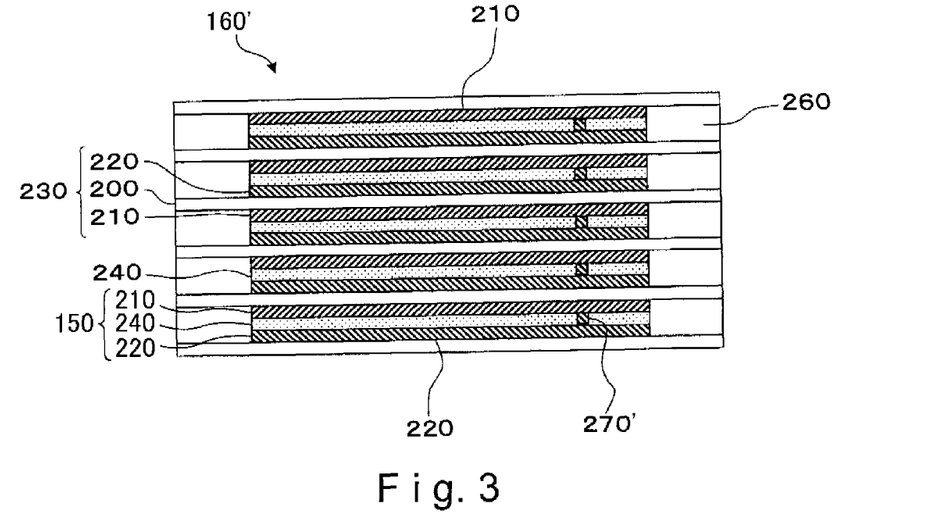
FIG. 3 is a simplified schematic cross sectional view of a modified electricity generating element of the bipolar battery in accordance with the first embodiment of the present invention.

As shown in FIG. 3, the modified electricity generating element 160' is provide with a plurality of short circuit layer 270' (discharging section). The short circuit layer 270' are formed so that there is an electrical connection between the corresponding pairs of the positive electrode layer 210 and the negative electrode layer 220. In the modified electricity generating element 160', carbon, a semiconductor, or the like is provided and disposed in a portion of each of the separators (that forms the gel electrolyte layer 240) to form the short circuit layer 270'.

Figure 4:
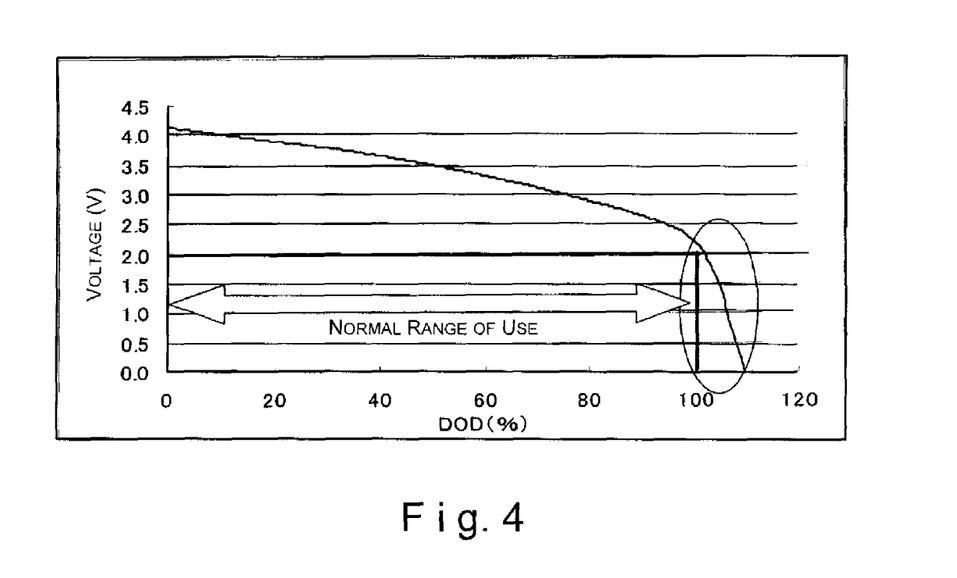
FIG. 4 is a graph illustrating an example of voltage characteristics of the bipolar battery in accordance with the first embodiment of the present invention.

Referring now to FIG. 4, the operation of the bipolar battery 100 in accordance with the first embodiment as discussed above will now be explained.

FIG. 4 is a voltage characteristics graph for explaining adjustment of voltage in the first embodiment. As mentioned above, the bipolar battery 100 of the first embodiment includes the discharging section (the short circuit layers 270 or 270') disposed inside the electricity generating element 160 or 160'. Each of the short circuit layers 270 or 270' are configured and arranged to electrically connect an adjacent pair of the bipolar electrodes 230 in the lamination direction (stacking direction) to conduct electricity at a prescribed discharge rate. The short circuit layers 270 or 270' (discharging section) are configured and arranged to evenly discharge electricity from the cells 150, which are each formed between the adjacent bipolar electrodes 230.

More specifically, the bipolar battery 100 of the first embodiment is configured and arranged so that the short circuit layers 270 or 270' are used to evenly discharge the cells 150 to a voltage at which the slope of the voltage with respect to the battery capacity is large as shown in FIG. 4. The voltage at which the slope of the voltage with respect to the battery capacity is large refers to an area (the encircled area in FIG. 4) that indicates the voltage that is below the normal range of use. In other words, the slope of the voltage with respect to the battery capacity becomes large when the depth of discharge DOD (i.e., an amount of energy that has been discharged from the bipolar battery 100) exceeds 100% as shown in FIG. 4. Thus, the voltage at which the slope of the voltage with respect to the battery capacity is large corresponds to, for example, a voltage value that is below the final or cutoff voltage of the bipolar battery 100.

Generally, if there are voltage variations initially or during use between the cells that are connected in series in the battery, then the cells that have lower voltages will influence the performance of the battery and the lifespan of the battery as a whole will be reduced. However, with the first embodiment of the present invention, the voltage of each of the cells 150 is adjusted by discharging to a voltage that is below the normal range of use (i.e., a voltage at which the slope of the voltage with respect to the battery capacity is large). In other words, as shown in FIG. 4, all of the cells 150 in the electricity generating element 160 are continuously or constantly discharged at a prescribed discharge rate so that the voltage of each of the cells 150 falls below a prescribed voltage (e.g., 2.0 V in the case of FIG. 4) where the depth of discharge DOD exceeds 100%.

Accordingly, each of the cells 150 is continuously or constantly discharged during use (e.g., when operating a load, such as a motor in the case of a vehicle, as discussed later) of the bipolar battery 100, and when not in use (e.g., when a load, such as a motor, is not operated) of the bipolar battery 100. Such discharge operation of the bipolar battery 100 discharges the cells 150 to voltages that are lower than the normally used voltages. Furthermore, if the cells 150 are charged while their voltages have decreased to voltages below the normally used voltages, then the cells 150 are began to charge at voltages that are below the voltage where the depth of discharge DOD exceeds 100%. Therefore, it is possible to obtain stable characteristics of the bipolar battery 100 as a whole without the occurrence of large variations in post-charge voltages in the cells 150.

Furthermore, charging causes the voltage of each of the cells 150 to reach a voltage that is within a range of 0% to 100% of the depth of discharge DOD (e.g., a voltage that exceeds the prescribed voltage of 2.0 V in the case of FIG. 4). However, because charging ends when such voltage (above the prescribed voltage within a range of 0%-100% of the depth of discharge DOD) is reached, the voltage variations between the cells 150 upon charging being started as mentioned above is maintained within a fixed range. Therefore, it is possible to suppress voltage variations between the cells 150 after charging. With the bipolar battery 100 in accordance with the first embodiment of the present invention, such constant discharging state can be automatically produced by providing the short circuit layers 270. Of course, the voltage of each of the cells 150 can be 0 V when charging of the bipolar battery 100 begins.

As mentioned above, the discharging section (the short circuit layers 270 or 270') for discharging each of the cells 150 in the manner described above is formed by, for example, filling the through hole 261 of each of the sealing layers 260 with a powder, such as carbon, a semiconductor, or a conductive ceramic. When the through hole 261 is filled with the appropriate material for the short circuit layer 270, the resistance of each of the short circuit layers 270 is set to a value that is derived by V÷(Q×C), wherein a value V is the fully charged voltage, a value Q is the battery capacity, and a value C is the discharge rate (e.g., the rate at which electricity is taken from the battery). For example, when a battery, which has a full charge voltage of 4.2 V and a capacity of 1 Ah, is to be discharged at a discharge rate of 0.1 C, then the resistance value is adjusted to 4.2÷(1×0.1)=42Ω. Furthermore, the discharge rate is preferably set to a value equal to or less than 0.25 C or, more preferably, to a value equal to or less than 0.1 C. Accordingly, it is possible to discharge all of the cells 150 below the voltage at which the slope of the voltage with respect to the battery capacity is large (i.e., below the voltage at which the depth of discharge DOD exceeds 100%).

The discharge rate is preferably set to be equal to or less than 0.25 C because if the discharging section (the short circuit layers 270 or 270') conducts electricity with a discharge rate greater than 0.25 C, then the current that flows through the discharging section during charging and discharging of the bipolar battery 100 will become excessively large, and thus, efficiency is degraded. Therefore, it is not preferable to provide the bipolar battery 100 with the discharging section (the short circuit layers 270 or 270') that has a resistance value that is too small. In addition, if the resistance value of the discharging section is too small, then the discharge amount will undesirably increase commensurately, and capacity of the bipolar battery 100 will thereby decrease commensurately. Therefore, it is more preferable to arrange the discharging section (the short circuit layers 270 or 270') to have a resistance value so that the discharge rate is equal to or less than 0.1 C.

However, the discharge rate is not limited to the values mentioned above, and can be set to any value as long as electricity is discharged in the bipolar battery 100 even when a load (e.g., a motor) is not operated, or even when a load itself is not connected, etc. Accordingly, if it is desired to shorten the time that takes to complete discharging, then the resistance of the discharging section should be set to a relatively low value so that the discharge rate is relatively high. On the other hand, if a long discharge time is acceptable, then the resistance of the discharging section should be set to a relatively high value so that the discharge rate is relatively low.

In addition, the short circuit layers 270 or 270' (discharging section), one of which is provided to each of the cells 150, can be configured and arranged to achieve different discharge rates respectively (i.e., have different resistance values). Since, as mentioned above, the discharging section is configured and arranged to discharge electricity from each of the cells 150 so that the voltage of each of the cells 150 falls below a prescribed voltage, it will be acceptable even if the resistance values of the short circuit layers 270 or 270' vary and the respective discharge rates also vary.

The lower limit of the discharge rate is not particularly limited as long as the discharge rate exceeds 0 C and discharging is performed continuously or constantly. However, the discharge rate needs to be greater than the rate of natural discharge that occurs when a load is not connected. Accordingly, the discharge rate obtained by the discharging section is preferably set to be equal to or less than 0.25 C and to exceed the natural discharge rate.

In addition, the voltage range during normal use is preferably defined as a range where the depth of discharge DOD is 0% to 100% as shown in FIG. 4. In other words, the short circuit layers 270 and 270' (discharging section) are configured and arranged to constantly discharge the electricity at a prescribed discharge rate so that a voltage in each of the cells 150 is lower than a voltage corresponding to a prescribed depth of discharge (e.g., 100% in the first embodiment). The voltage corresponding to the prescribed depth of discharge in the first embodiment corresponds to the encircled portion in FIG. 4.

According to the bipolar battery 100 of the first embodiment, it is possible to automatically correct voltage variations between the cells 150 without providing a complex circuit, such as a capacity adjusting circuit (C/C). Therefore, it is possible to reduce costs and increase the life span of the bipolar battery 100. In addition, by incorporating the discharging section in the electricity generating element 160 of the bipolar battery 100 as described above, it is unnecessary to extend several voltage detection lines to detect the voltages of the cells 150, and a plurality of bypass lines to bypass the cells 150, from the inside of the bipolar battery 100 to the outside. Therefore, the sealing characteristics of the bipolar battery 100 and the reliability of the sheathing material 180 are improved. In addition, the number of parts decreases since the voltage detection lines and the bypass lines that are not provided. Thus, it is possible to reduce assembly labor as well as fabrication cost. Furthermore, the process of insulating each of the voltage detection lines and the bypass lines inside and outside of the bipolar battery 100 is no longer necessary, and thus, there is no longer a risk of failures, such as internal short circuiting. Therefore, reliability is further improved from the perspective of ensuring the required insulation characteristics. Furthermore, because it is not necessary to separately provide a capacity adjusting circuit (C/C) outside of the bipolar battery 100, it is also possible to reduce the installation surface area of the bipolar battery 100. Moreover, in the case of an ordinary non-bipolar battery, the cells are connected in series after they are manufactured and it is therefore possible to connect the cells after uniformizing the voltages of the cells, which facilitates initial uniformization of the voltages. On the other hand, in the case of a bipolar battery, such an adjustment is usually difficult, and thus, it is effective to arrange the bipolar battery 100 in accordance with the first embodiment to overcome this problem.

With the voltage adjusting method of the bipolar battery 100, the electricity generating element 160 includes the cells 150 in which the conductive metallic foil (e.g., SUS foil) that has heat resistance and is not eluted by the discharge heat is used for each of the collectors 200, and each of the cells 150 is evenly discharged to a voltage at which the slope of the voltage with respect to the battery capacity is large. Thus, the capacity of the bipolar battery 100 can be adjusted within the area where the slope of the voltage with respect to the battery capacity is large when the voltage is less than the normal range of use (e.g., less than approximately 1.5 V) because the SUS foil, which is a conductive metallic foil that has heat resistance and is not eluted by the discharge heat, is used as the collectors 200 (collector foil). More specifically, because the collectors 200 (collector foil) do not elute even when the voltage is reduced to 0 V, it is possible to discharge to a voltage at which the slope of the voltage with respect to the battery capacity is large.

Second Embodiment

Referring now to FIGS. 5 to 9, a secondary battery 100A, an assembled battery module 250 (assembled battery unit), an assembled battery component 300 and an electric vehicle 400 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment of the present invention, the assembled battery module 250 includes a plurality of the secondary batteries 100A (battery elements) connected in series. Moreover, the assembled battery module 250 has a plurality of resistors 350. These resistors 350 are configured and arranged to constantly discharge electricity from each of the secondary batteries 100A at a prescribed discharge rate so that a voltage of each of the secondary batteries 100A is lower than a voltage corresponding to a prescribed depth of discharge.

Figure 5:
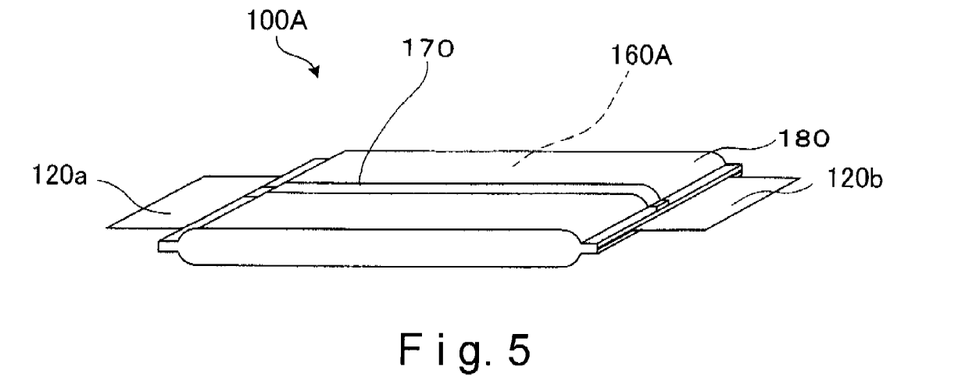
FIG. 5 is an overall perspective view of a secondary battery in accordance with a second embodiment of the present invention.
Figure 6:
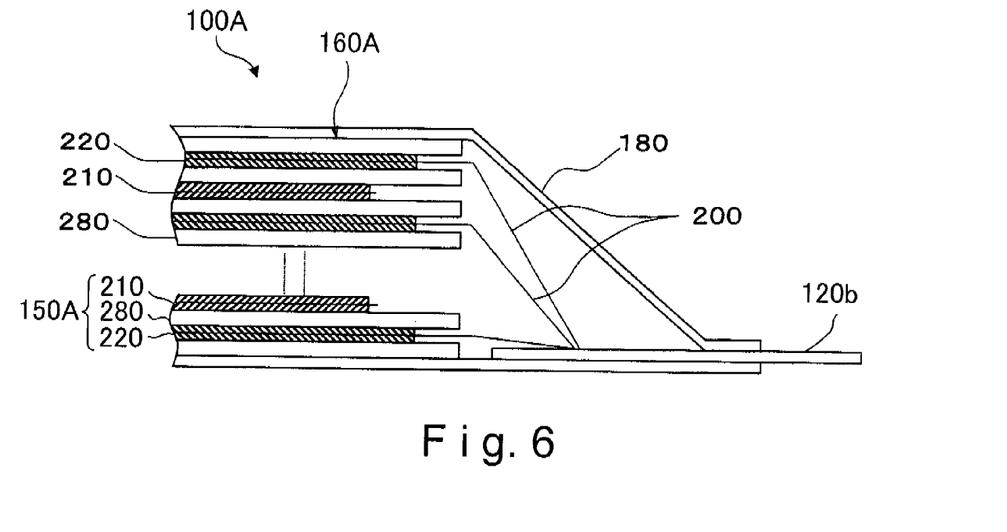
FIG. 6 is a simplified schematic partial cross sectional view of the secondary battery in accordance with the second embodiment of the present invention.

First, referring to FIGS. 5 and 6, the structure of the secondary battery 100A will be explained. FIG. 5 is an overall perspective view of the secondary battery 100A in accordance with the second embodiment. FIG. 6 a simplified schematic partial cross sectional view of the secondary battery 100A in accordance with the second embodiment of the present invention.

As shown in FIG. 5, the secondary battery 100A has a generally flat rectangular shape. The positive electrode tab 120a and the negative electrode tab 120b, which conduct electric power, extend out from both side parts of the secondary battery 100A. The secondary battery 100A includes an electricity generating element 160A disposed inside of the secondary battery 100A.

More specifically, the electricity generating element 160A is covered by the sheathing material 180 (e.g., laminate film), which is thermally fused at the end parts in the longitudinal direction as shown in FIG. 1. The electricity generating element 160A is sealed in a state wherein the positive electrode tab 120a and the negative electrode tab 120b are extending out from the sheathing material 180. Furthermore, the secondary battery 100A is packaged so that a thermally fused part 170 of the laminate film (sheathing material 180) is disposed on an upper surface of secondary battery 100A as shown in FIG. 1.

Referring now to FIG. 6, an internal structure of the secondary battery 100A will now be explained. As shown in FIG. 6, the electricity generating element 160A of the second embodiment includes the collectors 200, the positive electrode layers 210, the negative electrode layers 220 and a plurality of separators 280 disposed between an adjacent pair of the positive electrode layer 210 and the negative electrode layer 220. In the second embodiment, the separator 280 and the adjacent pair of the positive electrode layer 210 and the negative electrode layer 220 constitutes one of a plurality of electric cells 150A of the electricity generating element 160A.

The electricity generating element 160A is manufactured by first coating both sides of some of the collectors 200 with the positive electrode slurry and then drying it to form the positive electrode layers 210 coupled to the collectors 200. The collectors 200 are preferably made from a material that is not eluted by the discharge heat, e.g., a conductive metallic foil that has heat resistance, such as stainless steel foil (SUS foil). The material that is the same as that in the first embodiment to form the positive electrode layer 210 is used for the positive electrode slurry.

In addition, both sides of some of the collectors 200 (SUS foil) are coated with the negative electrode slurry and then dried to form the negative electrode layers 220 coupled to the collectors 200. The material that is the same as that in the first embodiment is used for the negative electrode slurry.

Then, silicone rubber is disposed on the outer peripheral parts of the separators 280 to form sealing layers, and a gel electrolyte layer is formed at the center part of the separators 280 on the inner side of the sealing layers of the separator 280. The separator 280 is preferably made from nonwoven fabric or a microporous membrane that is made of polypropylene and the like. The solution that is the same as that in the first embodiment to form the gel electrolyte layer is used for the pre-gel solution.

Thus, each of the cells 150A of the electricity generating element 160A is formed by stacking the positive electrode layer 210 and the negative electrode layer 220 to sandwich the gel electrolyte layer (the separator 280). The electricity generating element 160A is then formed by stacking the plurality of the cells 150A as shown in FIG. 6.

As shown in FIG. 6, each of the collectors 200 (SUS foil) that support the negative electrode layers 220 is electrically connected to the negative electrode tab 120b. Similarly, on a side not shown in FIG. 6, each of the collectors 200 (SUS foil) that support the positive electrode layers 210 is electrically connected to the positive electrode tab 120a (FIG. 5).

As mentioned above, the electricity generating element 160A is covered by the sheathing material 180 (e.g., a laminate film) and sealed. As shown in FIG. 5, the end parts of the sheathing material 180 in the longitudinal direction are thermally fused in a state wherein the positive electrode tab 120a and the negative electrode tab 120b are extending out.

Figure 7A:
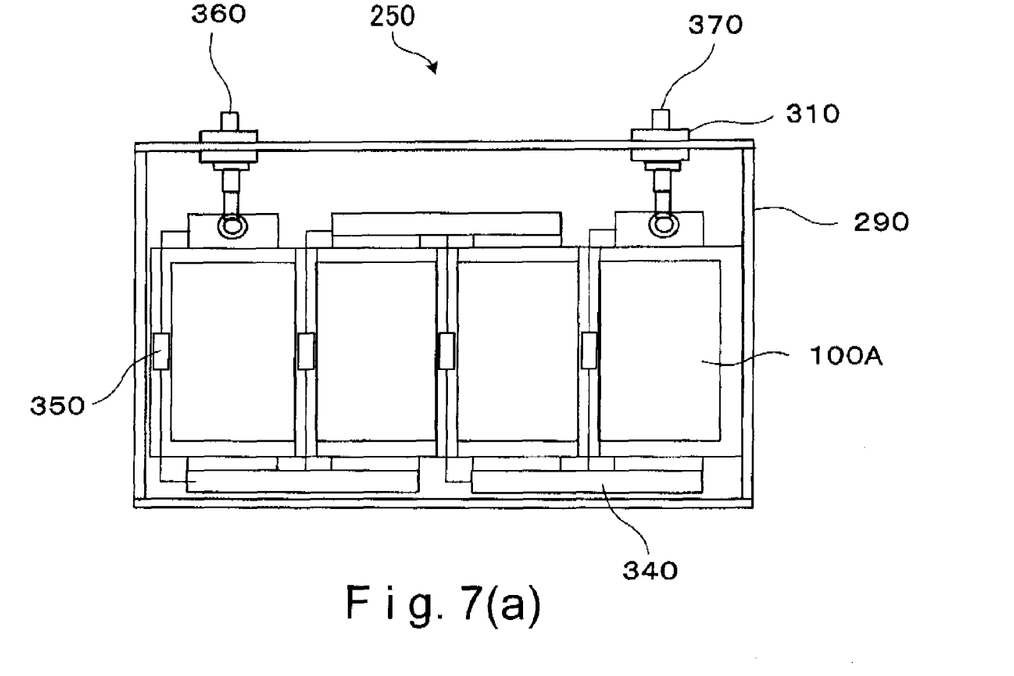
FIG. 7(a) is a schematic diagram illustrating an internal structure of an assembled battery module in accordance with the second embodiment of the present invention.
Figure 7B:
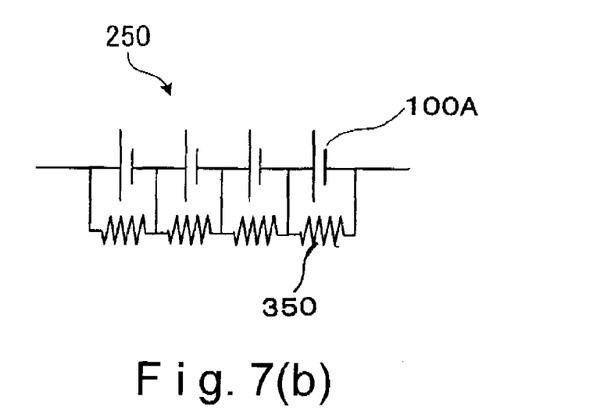
FIG. 7(b) is an equivalent circuit schematic of the assembled battery module illustrated in FIG. 7(a) in accordance with the second embodiment of the present invention.

Referring now to FIGS. 7(a) and 7(b), the assembled battery module 250 will be explained in accordance with the second embodiment of the present invention. FIG. 7(a) is a schematic diagram illustrating an internal structure of the assembled battery module 250 in accordance with the second embodiment. FIG. 7(b) is an equivalent circuit schematic of the assembled battery module 250 illustrated in FIG. 7(a) in accordance with the second embodiment of the present invention.

The assembled battery module 250 preferably includes four of the secondary batteries 100A illustrated in FIGS. 5 and 6. The secondary batteries 100A are preferably connected in series using a plurality of bus bars 340, and are housed inside a case member 290. Furthermore, the assembled battery module 250 includes a positive electrode terminal 360 and a negative electrode terminal 370 to extract the output of the four secondary batteries 100A.

The assembled battery module 250 further includes four of the resistors 350 having the same resistance value. Each of the resistors 350 is connected between an adjacent pair of the secondary batteries 100A as shown in FIG. 7(a). More specifically, each of the resistors 350 is provided to connect between the positive electrode tab 120a and the negative electrode tab 120b (FIG. 5) of each of the secondary battery 100A as shown in FIG. 7(b). Thus, the resistors 350 correspond to the discharging section in the second embodiment, which is configured and arranged to evenly discharge electricity from each of the secondary batteries 100A (the electric cell).

The resistors 350 (discharging section) are preferably configured and arranged such that electricity is discharged from each of the secondary batteries 100A at the discharge rate equal to or less than 0.25 C. The adjustment of the voltage variations between the secondary batteries 100A is performed when the assembled battery module 250 is not in use by discharging for, for example, 4 to 12 hours. If the resistors 350 are arranged such that the flow of the discharge current is larger than 0.25 C, then the current flows to the resistors 350 during use of the assembled battery module 250 (when charging and discharging the assembled battery module 250), which will degrade efficiency. Therefore, the resistor 350 whose resistance value is too small (i.e., whose discharge rate is too large) is impractical.

If the resistors 350 are not provided in the assembled battery module 250 in which the secondary batteries 100A are connected in series as shown in FIG. 7(a), then the charge states of the secondary batteries 100A may become unbalanced when the self discharge amount of each of the secondary batteries 100A that naturally occurs is different due to the difference in the characteristics of each of the secondary batteries 100A. In the worst case, a situation may arise in which one of the secondary batteries 100A that has a charge state of 0% and another of the secondary batteries 100A that has a charge state of 100% are connected in series. In such case, one of the secondary batteries 100A will overcharge when charging and, one of the secondary batteries 100A will overdischarge when discharging. Consequently, the current will stop flowing through the assembled battery module 250.

On the other hand, since the assembled battery module 250 of the second embodiment includes the discharging section (the resistors 350) that is configured and arranged to discharge each of the secondary batteries 100A at the prescribed discharge rate, voltage variations between the secondary batteries 100A are automatically corrected for each of the secondary batteries 100A. Therefore, it is possible to improve the reliability and durability of the assembled battery module 250 as a whole. In addition, an external apparatus for adjusting capacity is no longer necessary, which makes it possible to achieve a reduction in the size of the assembled battery module 250.

Moreover, a plurality of the assembled battery modules 250 illustrated in FIGS. 7(a) and 7(b) can be connected in series or in parallel to form the assembled battery component 300.

Figure 8:
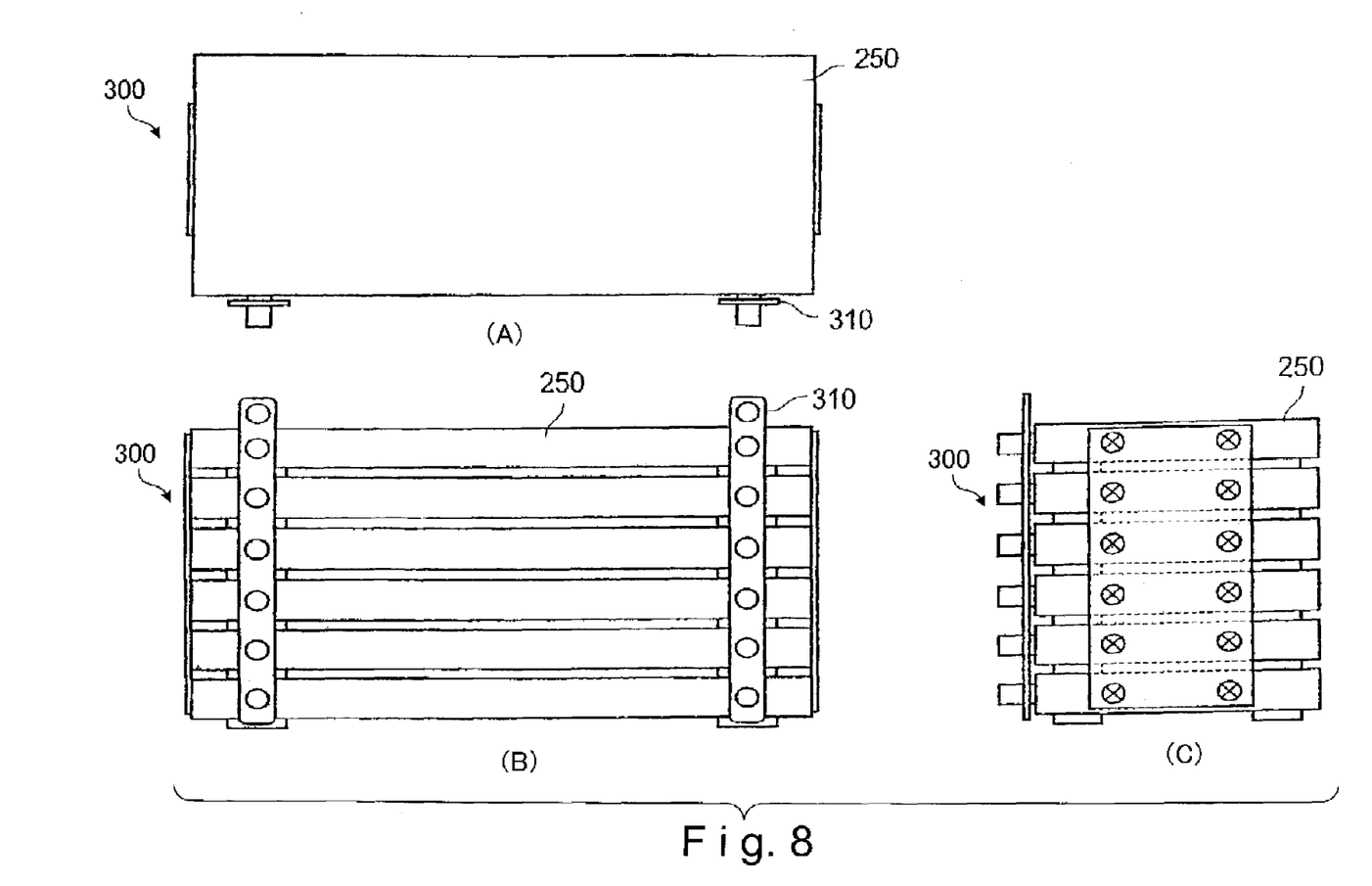
FIG. 8 is a series of diagrams (A) to (C) illustrating an assembled battery component including a plurality of assembled battery modules in accordance with the second embodiment of the present invention, wherein the diagram (A) is a top plan view of the assembled battery component, the diagram (B) is a front elevational view of the assembled battery component, and the diagram (C) is a side elevational view of the assembled battery component.

FIG. 8 includes a series of diagrams (A) to (C) illustrating the assembled battery component 300 including a plurality of the assembled battery modules 250 in accordance with the second embodiment of the present invention. The diagram (A) of FIG. 8 is a top plan view of the assembled battery component 300, the diagram (B) of FIG. 8 is a front elevational view of the assembled battery component 300, and the diagram (C) of FIG. 8 is a side elevational view of the assembled battery component 300.

The assembled battery component 300 includes, for example, six of the assembled battery modules 250 that are integrally bundled together. More specifically, the assembled battery modules 250 are connected to one another by using electrical connecting members, such as bus bars.

The assembled battery modules 250 are stacked to form a plurality of layers by using a plurality of connection jigs 310 as shown in the diagram (B) of FIG. 8. The number of the secondary batteries 100A that are stacked together to form the assembled battery module 250 and the number of the assembled battery modules 250 that are stacked together to form the assembled battery component 300 can be determined in accordance with the battery capacity and output of a vehicle (e.g., an electric vehicle) in which the assembled battery component 300 is to be installed.

Thus, the assembled battery component 300 having the assembled battery modules 250 connected in series or in parallel in accordance with the present invention can deliver high capacity and high output, and the high reliability of each of the assembled battery modules 250 makes it possible to maintain long-term reliability of the assembled battery component 300. In addition, even if some of the assembled battery modules 250 fail, it is possible to effect repairs by replacing only the defective ones of the assembled battery modules 250.

Furthermore, it is also possible to use a plurality of the bipolar batteries 100 or 100A of the first embodiment discussed above to form the assembled battery module 250 and the assembled battery component 300.

Figure 9:
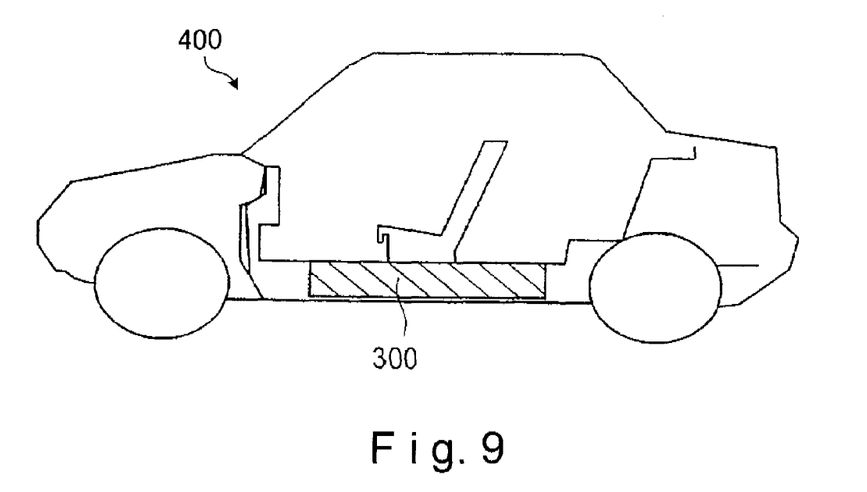
FIG. 9 is a schematic view of a vehicle equipped with the assembled battery unit in accordance with the present invention.

The assembled battery component 300 in accordance with the present invention can be installed in, for example, an electric vehicle. FIG. 9 is a schematic view of the electric vehicle 400 equipped with the assembled battery component 300 in accordance with the present invention.

As shown in FIG. 9, the assembled battery component 300 is preferably installed, for example, below a seat at a center part of the chassis of the electric vehicle 400. The assembled battery component 300 is preferably installed below the seat so that spaces in the vehicle (e.g., passenger compartment) and the trunk can be expanded. Furthermore, the installation location of the assembled battery component 300 is not limited to a position below the seat, and the assembled battery component 300 can be installed at the lower part of the rear trunk or the engine compartment at the front of the electric vehicle 400. The electric vehicle 400 that uses the assembled battery component 300 in accordance with the present invention is highly durable and can deliver ample output even over long term use. Furthermore, the use of the assembled battery component 300 also makes it possible to offer the electric vehicle 400 or a hybrid vehicle that has excellent fuel economy and running performance.

Furthermore, with the present invention, instead of the assembled battery component 300, just the assembled battery module 250 can be installed, or a combination of the assembled battery component 300 and the assembled battery module 250 can be installed, depending on the application. In addition, although a vehicle wherein the assembled battery component 300 or the assembled battery module 250 of the present invention is installed is preferably the electric vehicle 400 as discussed above or a hybrid car, the present invention is not limited such application.

Working Example

A working example of the battery according to the present invention will now be explained. However, the present invention is not limited to this working example.

Formation of Electrodes

First, one surface of a stainless steel foil (SUS foil), which is the collector that has a thickness of 20 µm, was coated with the positive electrode slurry and then dried to form the positive electrode layer that had a film thickness of 15 µm. The positive electrode slurry was a mixture of $LiMn_2O_4$ (85% by mass) (positive electrode active material), acetylene black (5% by mass) (conducting assistant), PVDF (10% by mass) (binder), and NMP (slurry viscosity adjusting solvent).

Next, the opposite surface of the collector (SUS foil), which is the surface that is opposite the surface whereon the positive electrode layer was coated, was coated with the negative electrode slurry and then dried to form the negative electrode layer that had a film thickness of 15 µm. The negative electrode slurry was a mixture of $Li_4Ti_5O_{12}$ (85% by mass) (negative electrode active material), acetylene black (5% by mass) (conducting assistant), PVDF (10% by mass) (binder), and NMP (slurry viscosity adjusting solvent).

The bipolar electrode was thus formed by forming the positive electrode layer and the negative electrode layer on opposite sides of the collector (SUS foil). Furthermore, the bipolar electrode was cut to a prescribed size, the positive electrode layer and the negative electrode layer were trimmed at the peripheral parts of the bipolar electrode, which exposed the SUS foil in order to form the sealing layer.

Formation of Sealing Layer

A sealing layer was formed by disposing silicone rubber that had a thickness of 60 µm on both sides of a polypropylene microporous film separator, which had a thickness of 20 µm, at a position that was 5 mm from the four outer sides of the peripheral parts of the separator.

Formation of Gel Electrolyte

A gel electrolyte was supported at the center part of the separator by permeating the inner side of the sealing layer of the separator, wherein the sealing layer was formed at the peripheral parts. The pre-gel solution was composed of a polymer (polyethylene oxide and polypropylene oxide copolymer) (5% by mass), EC+DMC (1:3) (95% by mass), 1.0 mol of $Li(C_2F_5SO_2)_2N$, and a polymerization initiator (BDK). Then, the thermal polymerization of the pre-gel solution is performed in an inert atmosphere to form the electrolyte layer.

Formation of Electricity Generating Element

Each of the cells was formed by stacking the bipolar electrodes and electrolyte supporting separators formed as described above so that the positive electrode layer and the negative electrode layer oppose one another and sandwich the gel electrolyte. The electricity generating element (battery element) was formed by repeating this procedure so that twelve cells in total were stacked together. The electricity generating element was then covered with a laminate pack and sealed by thermal welding, and the bipolar battery was thereby formed.

The thermally welded seal was formed by disposing two steel plates that were each 3 mm thick at the upper and lower surfaces of the bipolar battery, respectively, and applying a pressure of 1 kg/cm². In this working example, the electricity generating element wrapped by the laminate film was relatively thin, and thus, it was possible to weld just the peripheral portions where the laminate film was tightly sealed, even with the method that used such steel plates.

Evaluation

An assembled battery module of sample 1 (comparative example) was prepared in which twelve of the bipolar batteries as prepared above were connected in series in the same manner as illustrated in FIG. 7(*a*) except that the resistors were not provided in this sample 1. Also, an assembled battery module of sample 2 was prepared in accordance with the present invention in which twelve of the bipolar batteries as prepared above were connected in series in the same manner as illustrated in FIG. 7(*a*). In the sample 2 (working example of the present invention), the resistors or discharging section (corresponding to the resistors 350 in FIG. 7(*a*)) were attached as shown in FIG. 7(*a*), which had a resistance value that was equivalent to a discharge rate of 0.25 C. An equivalent circuit of the sample 2 is the same as FIG. 7(*b*) except for the number of the batteries and the resistors.

Figure 10:
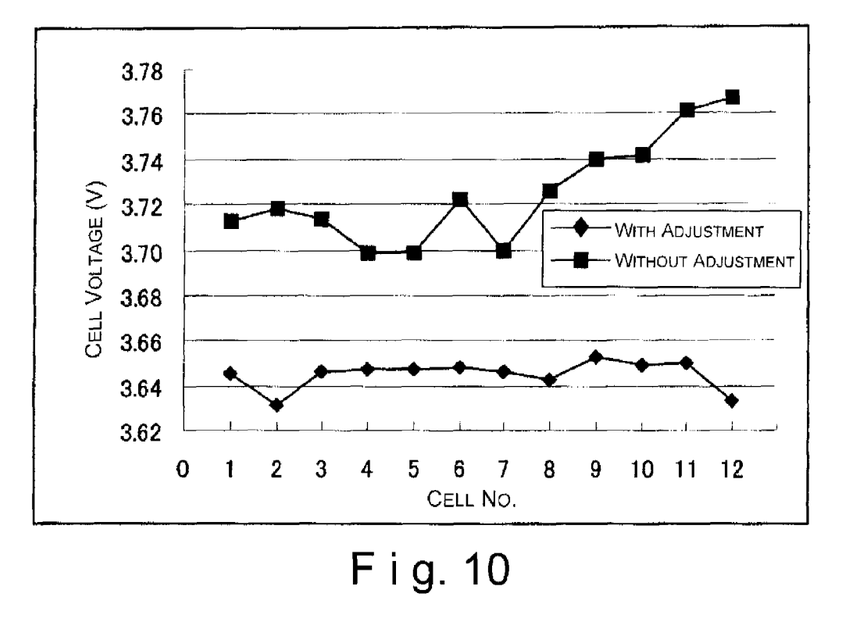
FIG. 10 is a cell voltage characteristics diagram illustrating a result in adjusting voltage variations in a working example of the present invention as compared to a comparative example.

FIG. 10 illustrates voltage characteristics of each of the twelve bipolar batteries (cells) (numbered from 1 to 12) included in the assembled battery module of the working example (sample 2) as compared to the assembled battery module of the comparative example (sample 1). As mentioned above, in the comparative example, no resistor or discharge section is provided.

First, the sample 1 was repetitively charged and discharged ten times with a current that was equivalent to the charge/discharge rate of 1 C. Then, the voltage of each of the bipolar batteries (cells) was measured. The results was recorded as "without adjustment" in FIG. 10.

The sample 2 was repetitively charged and discharged similarly to the sample 1. Then, the sample 2 was left for eight hours in a constant temperature bath at 25° C., and then charged once again to an overall voltage of 44 V (so that the voltage per cell was approximately 3.5 V). The voltage of each of the bipolar batteries (cells) was then recorded as "with adjustment" in FIG. 10.

As shown in FIG. 10, the voltages of the bipolar batteries (cells) varied greatly without adjustment (sample 1). However, with adjustment (sample 2), the voltages of the bipolar batteries (cells) were substantially evenly adjusted due to the uniform discharge by the resistors, which served as the discharging section.

In addition, since the entire assembled battery is initially discharged to a voltage that corresponds to 100% DOD (depth of discharge), the voltages can be adjusted in a relatively short time even if the resistance value is small.

According to the present invention, it is possible to automatically correct voltage variations between a plurality of electric cells or between a plurality of batteries. Therefore, the present invention can be applied to a bipolar battery in which several cells are connected in series, an assembled battery in which several secondary batteries are connected in series, and a vehicle wherein such batteries are installed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Moreover, terms that are expressed as "means-plus function" in the claims should include any structure that can be utilized to carry out the function of that part of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery comprising:
an electricity generating element including a plurality of electric cells connected in series; and
a discharging section configured and arranged to constantly discharge electricity from each of the electric cells at a constant discharge rate so that a voltage in each of the electric cells is lower than a voltage corresponding to when a depth of discharge exceeds 100%.

2. The battery as recited in claim 1, wherein
the electricity generating element further includes
a plurality of bipolar electrodes with each of the bipolar electrodes including a collector, a positive electrode layer formed on a first surface of the collector and a negative electrode layer formed on a second surface that is opposite from the first surface of the collector, and
a plurality of electrolyte layers with each of the electrolyte layers being interposed between an adjacent pair of the bipolar electrodes so that the positive electrode layer of one of the bipolar electrodes, the negative electrode layer of an adjacent one of the bipolar electrodes and the electrolyte layer disposed between the positive electrode layer and the negative electrode layer form one of the electric cells of the electricity generating element.

3. The battery as recited in claim 2, wherein
the collector is made from a material that does not elute when a current flows therethrough at a voltage that is below a lower limit of a range of use of the battery.

4. The battery as recited in claim 2, wherein
the collector is made of stainless steel.

5. The battery as recited in claim 2, further comprising
an outer packaging member tightly sealing the bipolar electrodes, the electrolyte layers and the discharging section.

6. The battery as recited in claim 1, wherein
the discharging section is configured and arranged to discharge electricity at the constant discharge rate that is equal to or less than 0.25 C.

7. An assembled battery unit including a plurality of the batteries as recited in claim 1, wherein
the plurality of the batteries are connected in either series or in parallel.

8. An assembled battery unit comprising:
a plurality of secondary batteries connected in series; and
a discharging section configured and arranged to constantly discharge electricity from each of the secondary batteries at a constant discharge rate so that a voltage of each of the secondary batteries is lower than a voltage corresponding to when a depth of discharge exceeds 100%.

9. The assembled battery unit as recited in claim 8, wherein
the discharging section is configured and arranged to discharge electricity at the constant discharge rate that is equal to or less than 0.25 C.

10. A vehicle including the battery as recited in claim 1, wherein
the vehicle has a power supply component that includes the battery.

11. A vehicle including the assembled battery unit as recited in claim 8, wherein
the vehicle has a power supply component that includes the assembled battery unit.

12. A battery voltage adjusting method comprising:
providing a plurality of battery elements connected in series; and
constantly discharging electricity from each of the battery elements at a constant discharge rate so that a voltage of each of the battery elements is lower than a voltage corresponding to when a depth of discharge exceeds 100%.

13. A battery comprising:
electricity generating means for generating electricity using a plurality of battery elements connected in series; and
discharging means for constantly discharging electricity from each of the battery elements at a constant discharge rate so that a voltage in each of the battery elements is lower than a voltage corresponding to when a depth of discharge exceeds 100%.

* * * * *